United States Patent [19]

Haferkamp et al.

[11] 3,998,057
[45] Dec. 21, 1976

[54] NUCLEAR POWERPLANT WITH CLOSED GAS-COOLING CIRCUIT

[75] Inventors: Dirk Haferkamp; Alija Hodzic, both of Mannheim; Ulrich Winter, Heidelberg, all of Germany

[73] Assignee: Hochtemperatur-Reactorbau GmbH., Cologne, Germany

[22] Filed: Jan. 31, 1975

[21] Appl. No.: 545,899

[30] Foreign Application Priority Data

Feb. 1, 1974 Germany ............ 2404843

[52] U.S. Cl. .................. 60/644; 176/60; 176/65
[51] Int. Cl.² ........................ G21C 15/02
[58] Field of Search ............. 60/644; 176/60, 65

[56] References Cited

UNITED STATES PATENTS

| | | | |
|---|---|---|---|
| 3,371,017 | 2/1968 | Coast et al. | 176/60 X |
| 3,656,566 | 4/1972 | Coast et al. | 176/60 X |
| 3,748,228 | 6/1973 | Zimmermann | 176/65 X |

FOREIGN PATENTS OR APPLICATIONS

2,038,375   4/1971   Germany ............ 176/65

Primary Examiner—Allen M. Ostrager
Attorney, Agent, or Firm—Bacon & Thomas

[57] ABSTRACT

Disclosed is a nuclear power plant comprising a pressure-tight safety vessel surrounding the entire plant, an inner vessel of reinforced concrete, a high-temperature reactor contained in the inner vessel, a gas turbine assembly having a turbine and a high- and low-pressure compressor located in a horizontally oriented chamber below the reactor, a plurality of heat exchange units positioned in a plurality of vertically oriented pods spaced radially symmetrically about the reactor and suitable conduits for carrying the reactive gas between the system components. The conduits are arranged in generally horizontally and vertically oriented straight lines, and the conduits for carrying low-pressure gas comprise a horizontal system positioned beneath the turbine assembly having a plurality of coaxial connecting tubes, collectors and distributors as well as normal conduits, so that high pressure gas flows in the internal passage and low-pressure gas flows in the outer passage.

22 Claims, 7 Drawing Figures

NUCLEAR POWERPLANT WITH CLOSED GAS-COOLING CIRCUIT

BACKGROUND OF THE INVENTION

The invention covers a nuclear power plant with a closed system of circulating cooling gas. The equipment consists of a high-temperature reactor, a gas turbine assembly and heat exchangers. The latter are made up of recuperators, pre- and intermediate coolers as well as pipes carrying the gas between the several components. The entire assembly is encased in a housing made of pre-stressed concrete (single-unit construction).

Plants of the type described offer obvious advantages over nuclear power installations of a different, existing type in which the energy is transferred to a secondary circuit, because they combine the advantages of gas turbines with the high efficiency and simplicity in operation which is typical of single-circuit construction. By integrating the reactor, the turbines, the required coolers, and all other circuit components in a single pressure tight vessel, separate connecting elements connecting the components that contain "live" fuel are rendered unnecessary, a fact which offers distinct advantages in the construction and operation of high-temperature reactors. The integrated design is therefore preferred for a large number of specialized nuclear power plants.

For example, German Auslegeschrift No. 1,156,903 describes a compact power plant of the above-mentioned type intended for vehicles. In this design the turbine and the compressor are located on opposite faces of the reactor core, a hollow shaft passing through the core, with intermediate coolers being located in the annular space between the reactor and the wall of the pressure chamber.

In this compact design it is assumed that the turbine used will not require any maintenance, and therefore no provision has been made for the removal of the turbine or any other components of the circuit.

A similar construction is shown in a nuclear reactor disclosed in German Offenlegungschrift No. 2,005,208 where a pressure jacket, open at its frontal surfaces, is located inside the pressure chamber and is spaced relative to the inside wall of the pressure vessel so as to accommodate the heat exchangers.

Also, the German Offenlegungsschrift No. 2,028,736 a nuclear power plant is described having a system of closed circulation of gas. This power plant is built on the principle of dual chambers. The gas turbine together with the components belonging to the gas circulation system are contained in a block of prestressed concrete separate from the concrete pressure vessel, with the object of simplifying the fueling- and controlling processes.

A similar construction is used in the high-pressure concrete vessel described in German Auslegeschrift No. 1,614,610, consisting of two separate pressure-tight chambers, one containing the reactor, the other the secondary equipment. The working medium is carried by pipes protruding through the pressure-tight walls, first from the reactor to the turbine and from the compressor then back into an annular-shaped space below the reactor core. This so-called "igloo-method" however offers technical difficulties in construction, and the nuclear power plant, because of the principles applied in the arrangement of components, is highly uneconomical.

German Offenlegungsschrift No. 2,062,934 likewise discloses a gas-cooled nuclear reactor of integrated construction in which the gas turbine is located inside the hollow wall of the pressure chamber enclosing the reactor core. Through a by-pass mechanism a part of the cooling gas carried past the core of the reactor can be diverted and directly combined with the hot exhaust gas emitted from the core.

Another nuclear power plant of the type originally defined is described in German Offenlegungsschrift No. 1,764,249. Here the nuclear reactor together and all circulatory components are located in closely spaced, parallel, vertical shafts inside the concrete pressure vessel, with all components being fully accessible from the outside. Passages for the cooling media are provided within the wall of the pressure vessel as well as between the several vertical shafts. In this design the cooling media has to flow over an extensive area, resulting in the need for a relatively bulky pressure vessel in this type plant.

SUMMARY OF THE INVENTION

The present invention proceeds from the foregoing state of the art and has as an object to correct the shortcomings inherent in the known nuclear power plants through a particular arrangement of all components. It is a particular object of the invention to provide a compact nuclear power plant, while at the same time rendering all components easily accessible.

In accomplishing these and other objects, there has been provided in accordance with the present invention a nuclear power plant comprising an inner, generally cylindrical vessel; a high-temperature reactor contained within the inner vessel; a gas turbine assembly located in a horizontally oriented chamber positioned in the inner vessel beneath the reactor; a plurality of heat exchanger means positioned in a plurality of vertically oriented pods spaced radially, preferably in a circle about the reactor in the inner vessel; and conduit means interconnecting the reactor, the turbine assembly and the heat exchanger means for carrying a gas between these components. The conduit means are arranged in essentially horizontal and vertical straight lines, and the conduit means connecting the reactor and the turbine for carrying high pressure gas are provided with horizontal connections to the reactor and the turbine. The conduit means for carrying low pressure gas comprises a horizontal conduit system positioned beneath the turbine assembly and is comprised of a plurality of coaxial connecting tubes, collectors and distributors and a plurality of normal conduits.

The remainder of the heat exchange means comprise intermediate coolers, preferably arranged in vertically stacked pairs in each pod, and coaxial conduits are provided for transporting gas from the low-pressure compressor to the intermediate coolers, through the outer passage of the conduit, and back from the coolers to the high-pressure compressor through the inner passage of the conduit. A plurality of secondary heat absorption devices are preferably also located in additional vertical pods arranged around the reactor.

The structural features of the present invention may thus be summarized as follows: The gas-turbine system is installed in a horizontal pod located underneath the reactor which is located centrally inside a vessel; several vertical pods, placed symmetrically around the reactor, contain the recuperators and the pre-coolers; the pre-coolers serving the recuperators are placed above or below the recuperators; the tubes carrying the gas between components run in a straight path, either vertically or horizontally, with vertical tubes being in pods; the high-pressure circuit runs through several vertical pods equipped with horizontally placed connections; a horizontally positioned system of tubes carrying low-pressure gases is placed underneath the turbine compartment.

The principles realized in the nuclear power plant according to the invention may be briefly summarized as follows:

a largely symmetrical structure of the vessel made of pre-stressed concrete;

development of pods as vertical gas lines;

gas lines connecting the various components in the primary circuit are direct and in straight lines;

gas lines are arranged coaxially and maintain in normal operation only minor differences in pressure between the gas streams flowing coaxially;

streams of hot gases flow coaxially inside an isolated system of tubes that are freely distributed inside the pre-stressed concrete vessel and shielded by high-pressure jackets which are surrounded by a circuit of cold gas;

easy accessibility from the outside of secondary equipment built into the structure, such as gas lines, heat exchangers, values, heat insulators, etc. for the purpose of inspection, maintenance, repair, and removal after shutting off certain sections of the plant. All pods, gas lines and components of the primary circuit are geometrically accessible upon the removal of the lid of the concrete container, allowing for inspection, maintenance and repair by remote control. The convenient accessibility is the result of the coaxial arrangement of gas lines in relatively large concrete channels, the direct gas leads being arranged in straight lines, and the use of pods serving as vertical gas ducts. By locating two separate gas circuits in one single concrete unit, compactness of the primary circuit is achieved, and the dimensions of the concrete container can be held down to a relatively small size.

The arrangement of the various components is such that it can be retained at any desired level of varying output without difficulty, a fact which is of great importance in the development of new types of nuclear reactors.

The turbine assembly is built in a horizontal chamber placed at a distance from the nuclear reactor which offers adequate shielding to the turbine assembly against neutron radiation. For the installation and removal of the turbine assembly a sliding device has been provided.

The turbine assembly is constructed with a single shaft, offering distinct advantages over a multiple-shaft design: its operation and normal functioning are easy to supervise and of proven reliability; it requires only a single seal where the shaft penetrates through the concrete jacket; and its cost is lower. The turbine is rigidly coupled to the generator.

The hot gas coming from the reactor is first taken up by four radially located connecting pipes and then carried over vertical ducts containing hot gas, designed as pods. Then, it is carried by four horizontal connecting tubes to the symmetrically designed intake tubes of the turbine. The four radial connecting pipes together with their graphite packings extend all the way to the vertical gas pipes formed as pods.

The exhaust gas from the turbine (approx. 500° C.) first flows downward in a vertical pipe where it enters into the horizontal system of tubes carrying low-pressure gas. By distributors and coaxial cross-connections or feeder lines the gas is distributed to the pods which contain the recuperators and pre-coolers. Upon entering the recuperators it flows through them along the jacket side. The gas subsequently passes through the pre-coolers and is finally returned to the horizontal pipe system. In the return flow, the gas is directed through the outer passages if the coaxial ducts, while on its way to the recuperators it is directed through the interior passages of the coaxial feeder line system. The coaxial network of cross-connections or feeder lines is designed in such a manner that the exhaust gases leaving the turbine at about 500° C. are encircled on all sides by cold gas, whereby thermal stresses in the gas lines are minimized.

The cold gas (30° C.) from the horizontal pipe system enters a vertical cylindrical duct through several simple horizontal ducts and is then brought into the low-pressure compartment of the compressor. Here it is compressed to 36 bar.

In an advantageous embodiment of the invention six recuperators are provided, which are connected in pairs via a coaxial feeder line to a collector and a distributor. Accompanying pre-coolers are located respectively vertically underneath the recuperators.

The compressed gas is carried back to the recuperators by six pipes. A major portion of four of these six pipes runs coaxially to the vertical gas pipes leading from the reactor to the turbine. Thereby the relatively cold high-pressure gas (125° C.) encircles the four hot-gas pipes between the reactor and the turbine.

In order to increase the efficiency of the nuclear power plant, an intermediate cooling system is provided in the primary circuit, also located in the vertical shafts or pods. These pods are arranged in the same circle about the reactor as the pods holding the recuperators and pre-coolers and are symmetrically placed with respect thereto. The intermediate coolers are connected in two groups, each containing a pair of intermediate coolers, installed on top of each other in a single pod.

Two coaxial pipes lead from the low-pressure compartment of the compressor to the two pods holding the pair of intermediate coolers. The gas flows in the outer pipes toward the pods where it is divided into two partial streams, one flowing upward, the other downward. After passing through the intermediate coolers the gas is carried back to the high-pressure compartment of the compressor through the interior tube of the coaxial system.

The hollow pods in the concrete housing, designed to house the components, such as the reactor, the horizontal turbine compartment, vertical pods for heat exchangers, gas ducts and regulators, are preferably lined with gas-tight steel liners. Excess pressures are taken up by the concrete jacket and to reduce the build-up of excessively high temperatures in the concrete, the liners are watercooled and further protected by insulation.

As mentioned before, the intermediate coolers serve to increase the efficiency of the plant. It is, however, conceivable to design nuclear power plants in which intermediate coolers are omitted, whereby a reduction in efficiency may be accepted in exchange for various other advantages. The most important of these advantages may be summarized briefly as follows: smaller dimensions of the pre-stressed concrete vessel; elimination of expensive components (besides the intermediate cooling units also steel liners, gas ducts, and other devices connected with the construction of the installation); a reduction in the size of the cooling system; and a reduction of pressure-losses connected with circulating systems. In a power plant of this type the stream of gas leaving the compressor is conveyed directly into the recuperators.

It is of advantage to additionally provide a final stage for the elimination of heat inside the stressed-concrete casing, conventionally consisting of a blower, equipped either with or without a recuperator, and a cooler. Such a cooling system operates independently of the main circulation system for the described single-shafted gas turbine assembly; it provides for the disposal of the reactor's heat in the event of a turbine failure, in times of shut-downs, and in the event of break-downs. The secondary heat disposal system (4 × 50%) is located in four vertical shafts or pods distributed symmetrically around the reactor. It is designed to afford a possible by-pass of the main circuit in the event of a break-down, without requiring additional safety valves for a shut off.

All valves needed for shutting down the nuclear reactor are advantageously located inside the concrete housing, also placed in vertical pods or shafts, further adding to the safety and compactness of the plant, with these valves being readily accessible from the outside.

All components carrying active gas are advantageously integrated inside a safety housing and are accessible while the plant is in operation. The housing has openings required for the installation and removal of components in need of maintenance or repair. The housing, made of pre-stressed concrete, is located in the central area of the safety tank. On the top of this tank is placed a revolving crane used for moving major components in or out of the tank.

In the case of a power plant having an output of 1,000 MW, the safety tank is equipped with a cylindrical compartment, which can be sealed off, gas- and pressure-tight, by a simple lid, for holding the generator which is rigidly coupled with the gas turbine assembly. The generator, together with its mounting, can be slid into the compartment, and if necessary, removed again.

Further objects, features and advantages of the invention will become apparent from the following detailed description of a preferred embodiment when considered with the attached figures of drawing.

DETAILED DESCRIPTION OF PREFERRED EMBODIMENTS

Figure 1:
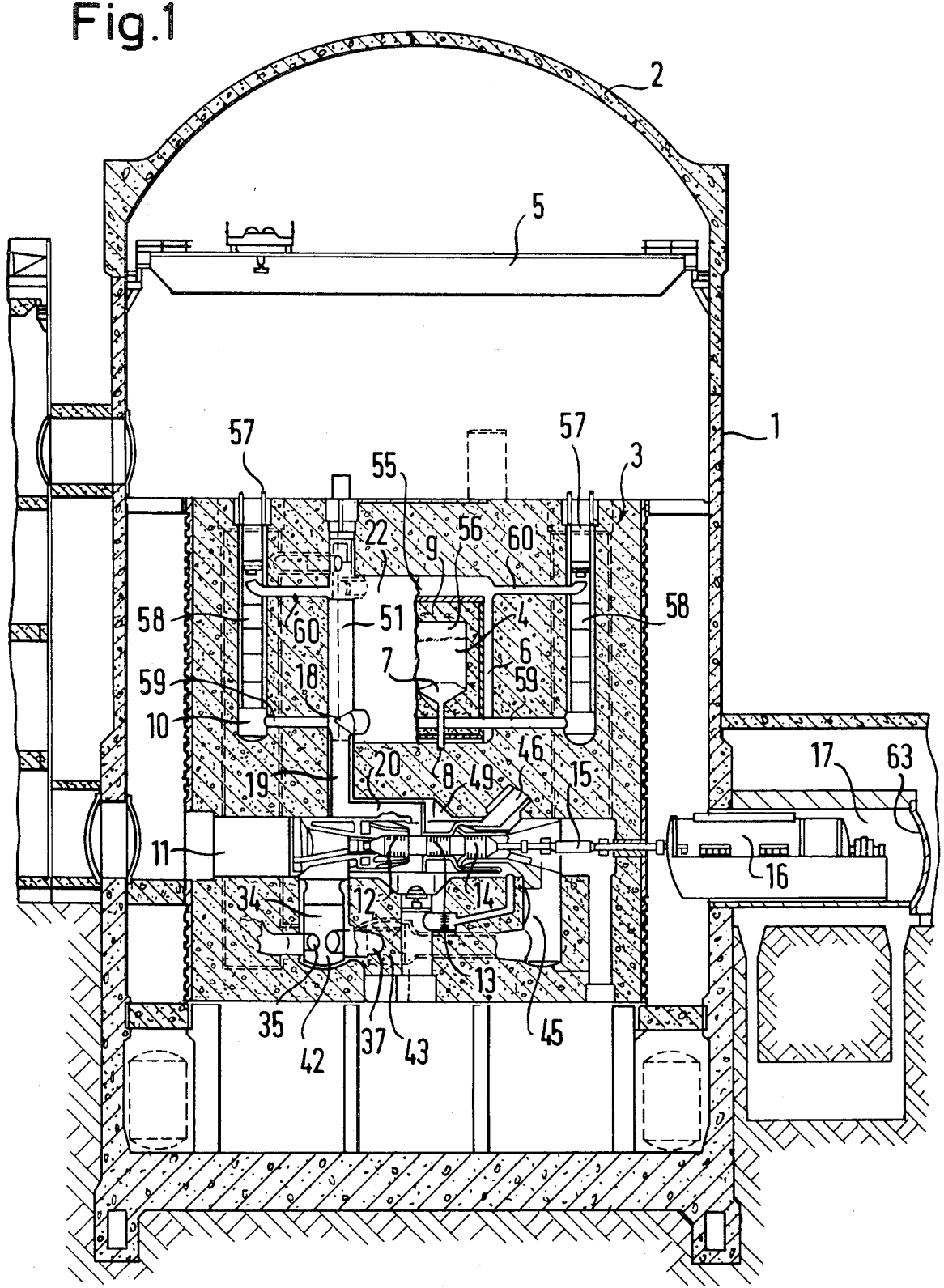
FIG. 1 is a fragmentary vertical sectional view of a nuclear power plant according to the invention taken substantially along the line I — I in FIG. 2.
Figure 2:
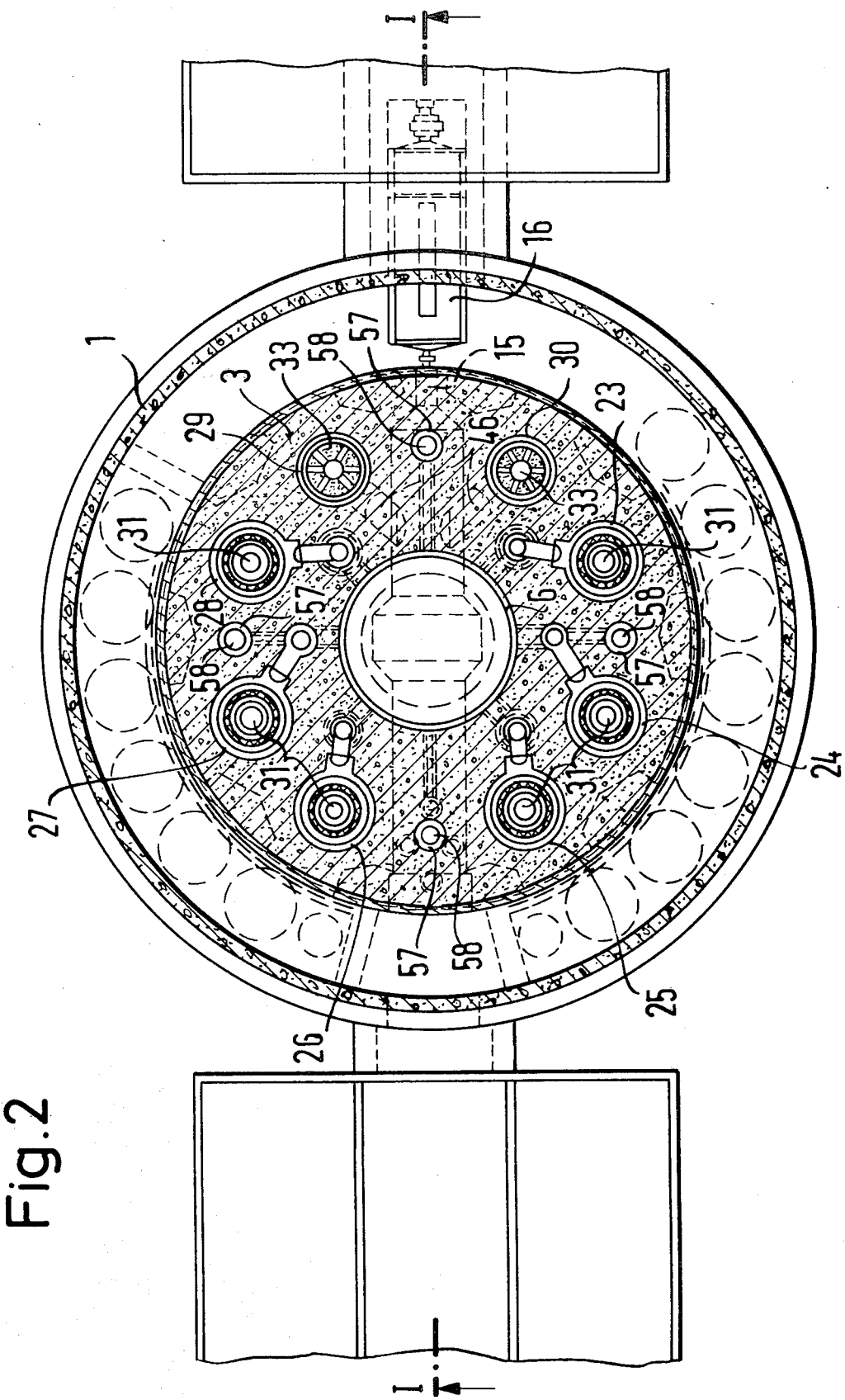
FIG. 2 is an enlarged fragmentary horizontal section taken substantially along the line II — II in FIG. 3.

FIGS. 1 and 2 show a pressure-tight safety tank 1 of cylindrical shape made of reinforced concrete, closed at the top by a domed cap 2. Centrally inside the safety tank a likewise cylindrical structure of pre-stressed concrete 3 is placed which encloses a high-temperature reactor 4 together with the set of components that makes up the primary circuit described in detail below (the turbine assembly, heat exchangers, gas lines). Also placed inside the safety tank 1 are all auxiliary components that carry the active gas, and all other equipment needed for the operation of the primary components. Of these the drawings show only the revolving crane 5 serving as the main lifting device, located in a plane some distance below the lower edge of the domed cap 2. The work area of this crane is large enough to allow for the movement of all components installed in safety tank 1.

The high-temperature reactor 4 is built into a cavity or vessel 6. It is a helium-cooled ball-pile reactor with graphite moderation, shown in the drawing as consisting of core 7, located at the bottom of the core, a connecting ball-release tube 8 and a suspended ceiling reflector 9. Underneath the floor of the reactor core is the collector chamber 10 which receives the hot gas released by the ball pile. The reactor 4 is connected with the primary circuit by six intake- and four vents (as described below.).

Perpendicularly under the high-temperature reactor 4 and at a distance adequate to assure shielding, a horizontal chamber 11 is built inside the pre-stressed concrete housing 3. In the chamber have been placed a single-phase gas turbine 12 together with high and low-pressure compressors 13, 14, installed coaxially with the gas turbine 12 on a common axle 15. The turbine and the compressors are inserted in the assembly as one unit on a rail leading into the horizontal chamber 11, by the so-called "insertable construction" method. A removable generator 16, located in a cylindrical recess 17, is rigidly coupled to the gas turbine 12. This cylindrical recess 17 is closed gas- and pressure-tight by lid 63.

Four radial connecting pipes 18 carry the gas from hot-gas collectors 10 to the vertical hot-gas lines 19, which, in turn, are connected by horizontal tubes 20 to the four symmetrical intake-valves 21 of turbine 12. The four radial connectors 18 by which helium, heated to 850° C., is carried to turbine 12, extend together with graphite packings 22 of the reactor, to the vertical hot-gas pipes 19. This placement facilitates the installation and removal of the hot-gas pipes 19 which each are composed of four pieces.

Figure 3:
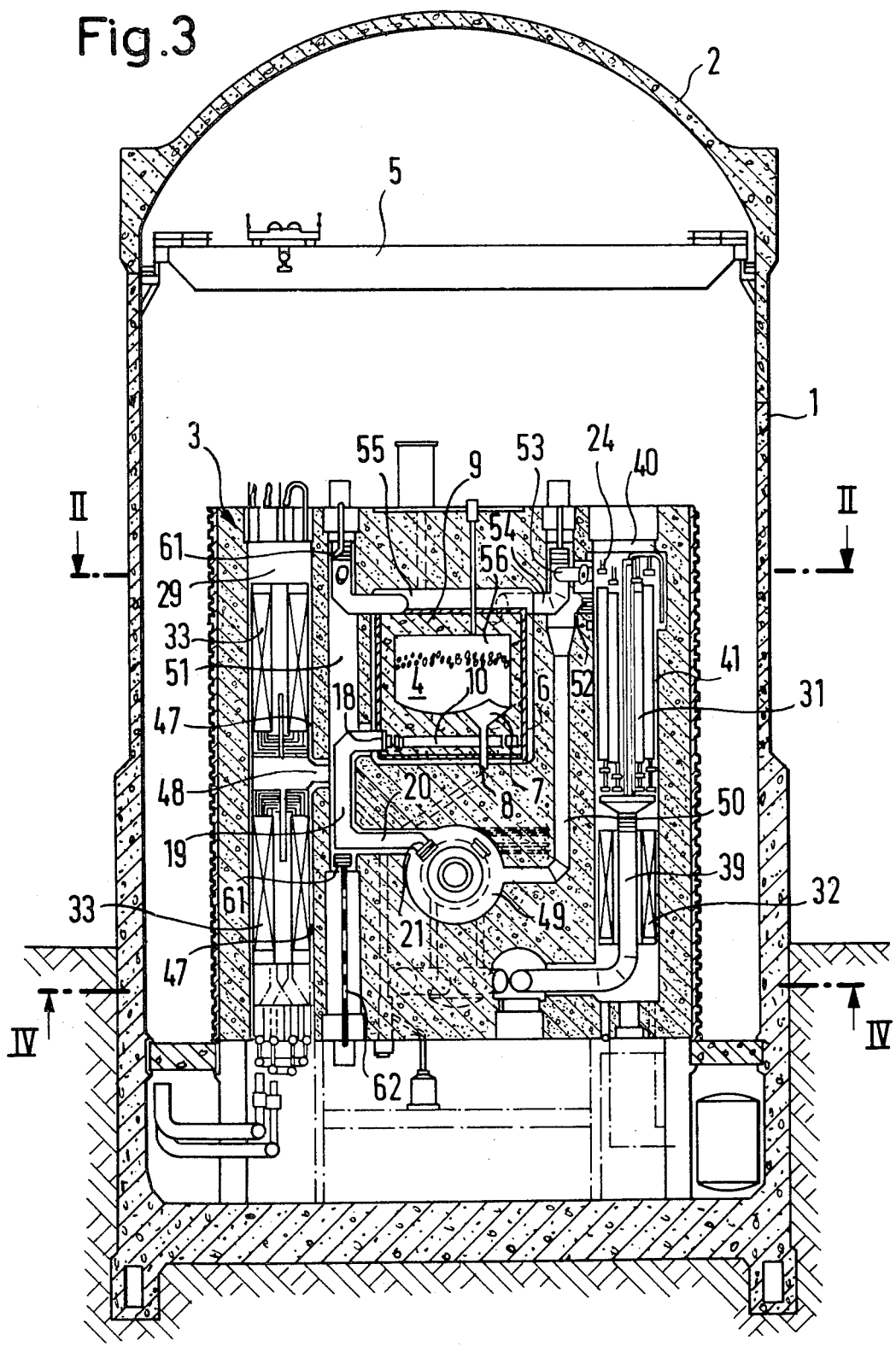
FIG. 3 is a fragmentary vertical sectional view taken substantially on the staggered line III — III in FIG. 4.
Figure 4:
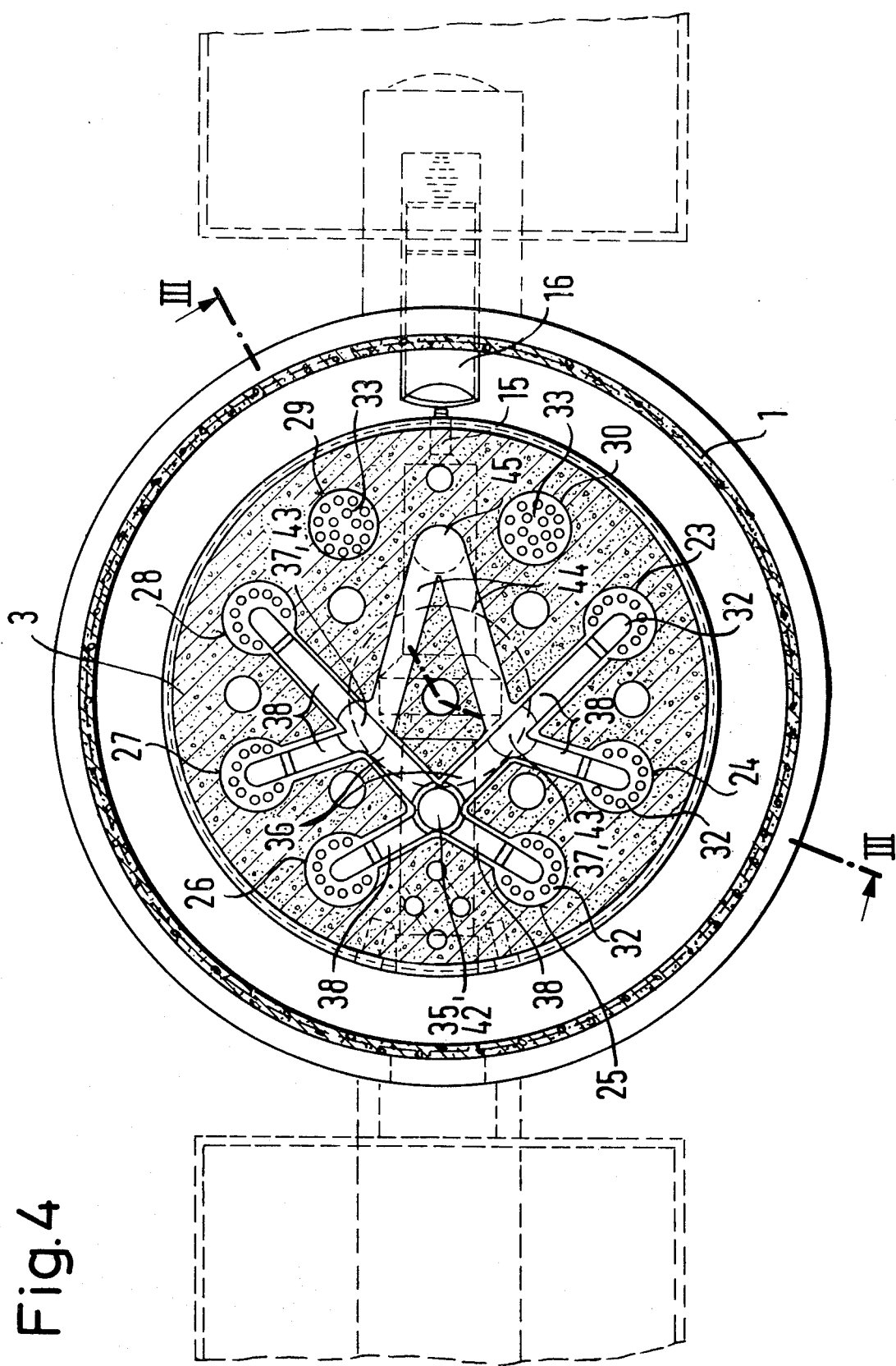
FIG. 4 is an enlarged fragmentary sectional view taken substantially along the line IV — IV in FIG. 3.
Figure 5:
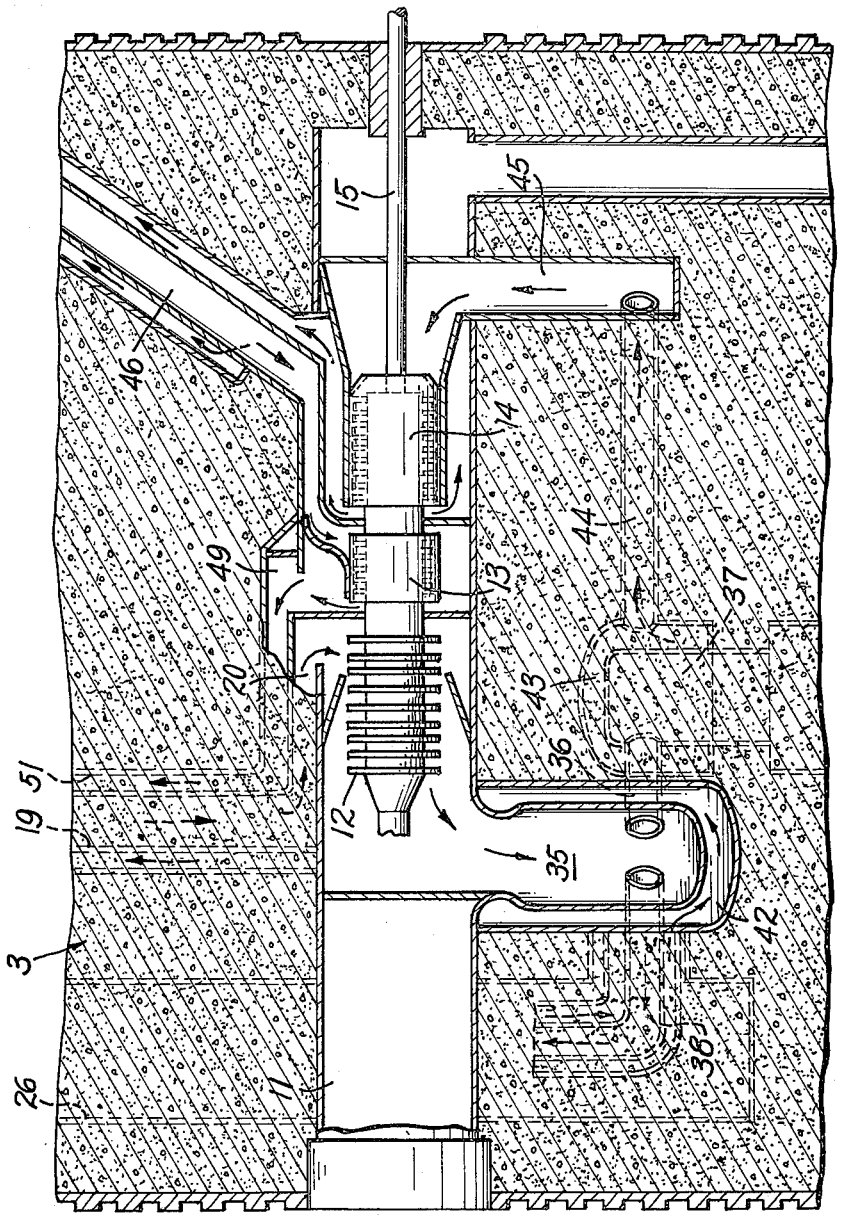
FIG. 5 is an enlarged diagrammatic fragmentary vertical sectional view, showing the gas turbine wheel and compressors.
Figure 6:
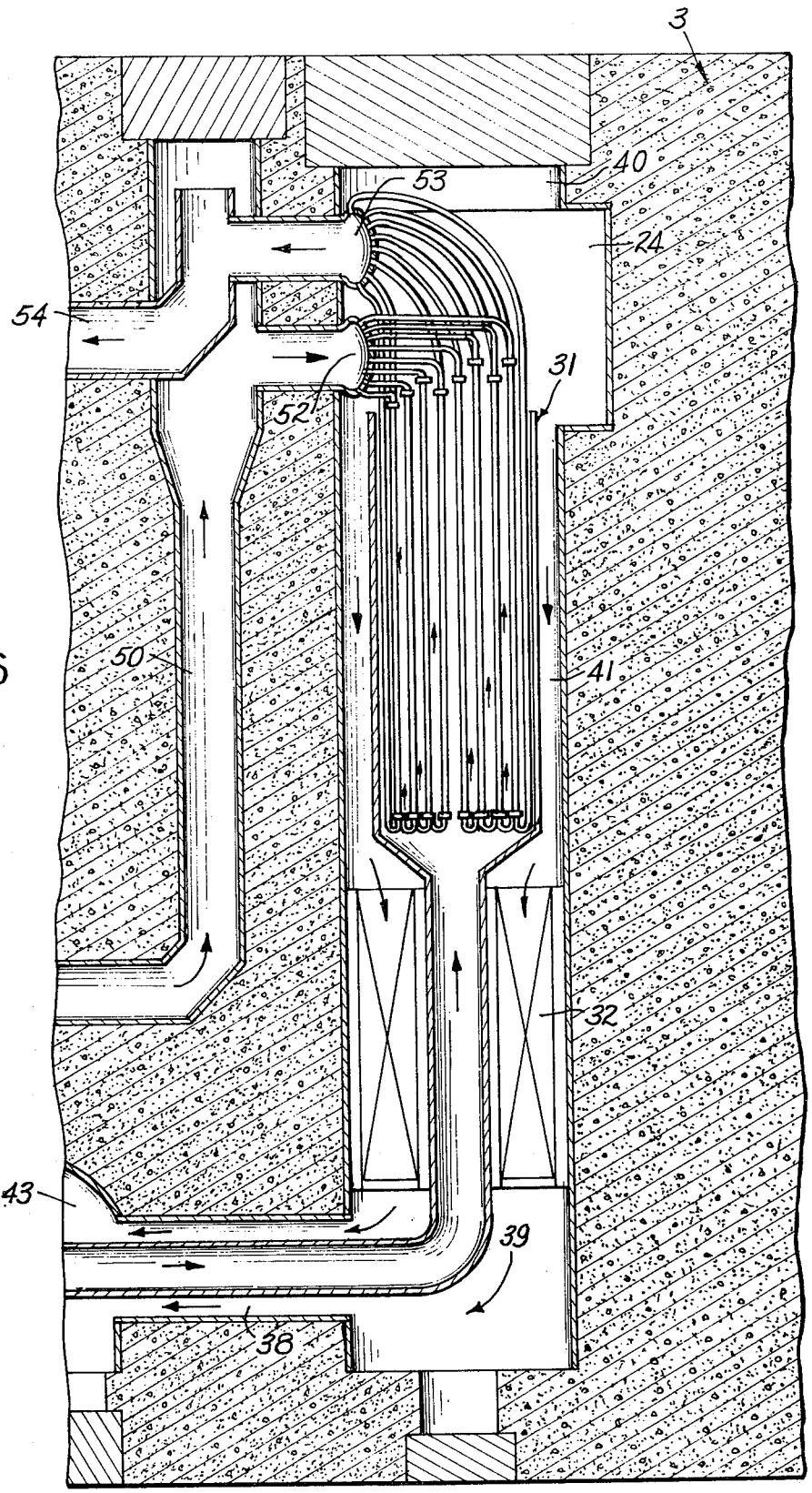
FIG. 6 is an enlarged diagrammatic vertical sectional view, illustrating the recuperator and pre-cooler.
Figure 7:
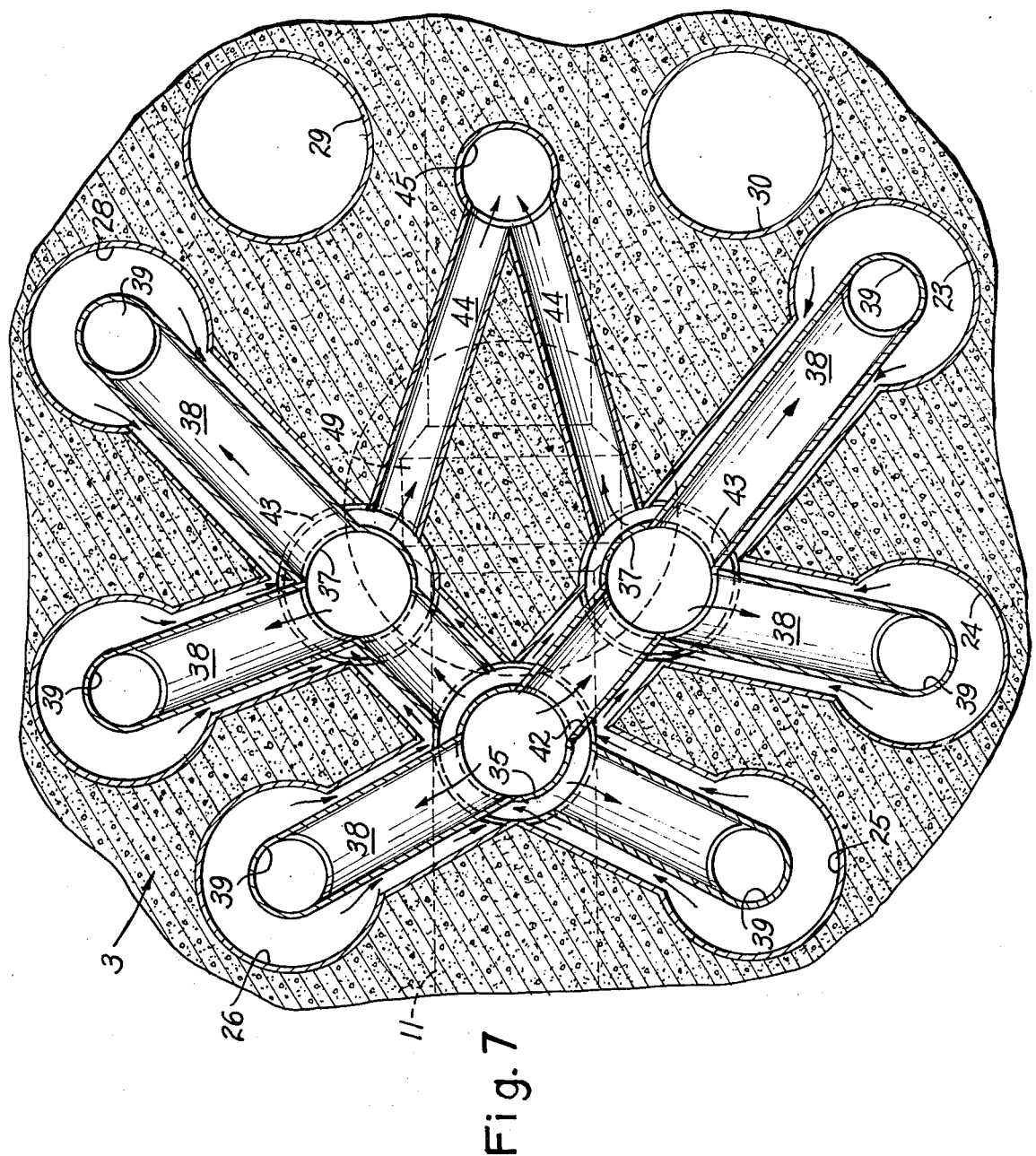
FIG. 7 is an enlarged diagrammatic fragmentary horizontal sectional view, similar to FIG. 4, showing the arrangement of the co-axial gas conduits.

In a circle around reactor vessel 6, eight perpendicular shafts or pods 23, 24 . . . 30 are provided, spaced symmetrically to each other and at a suitable distance from the wall of the concrete housing 3, extending nearly the total height of the structure. These large pods are closed off by explosion-proof lids. These lids are shown in FIG. 3 both at the top and at the base of concrete housing 3. In six of these pods, namely in pods 23, 24 . . . 28, a recuperator 31 is placed, on a level with reactor 4, and a pre-cooler 32 is connected to each recuperator vertically beneath it. The remaining pods 29, 30 are used for holding the four intermediate coolers 33 installed therein one above the other in pairs. The six recuperators are designed as counter-flow elements with the tube bundles in a triangular arrangement that facilitates the replacement of individual defective cells. The pre-coolers 32 as well as the intermediate coolers 33 are arranged in a helical construction, thus permitting pressure tests to be taken on individual tubes or areas from outside of housing 3, also permitting these areas to be inactivated and by-passed. By the use of such well-known and proven elements of design, a high degree of reliability is attained in connection with the heat exchangers.

The system for collecting and distributing low-pressure gases discharged by the turbine is located underneath turbine chamber 11. The exhaust gas, heated to 500° C. first flows in a vertical duct 34 downward into distributor 35, then through two coaxial feeder ducts 36 and into distributors 37. Connected to each distributor are two coaxial feeder tubes 38 which serve to distribute the gas over the six pods 23, 24 . . . 28. The gas now flows through the interior pipe of the coaxial feeder ducts 36, 38. Inside the pods, the gas moves through the interior ducts 39 (FIG. 3) which are leading through the pre-coolers 32; it then enters the recuperators 31 through which it flows on the side of the jacket. The gas is thereby cooled to approximately 160° C. Upon being reversed by 180° in a collection chamber 40 located on top of recuperator 31, the gas is carried through an annular shaped aperture 41 between the recuperator and the wall of the pod, and reaches pre-coolers 32 through which it flows on the side of the jacket. The gas, now cooled down to approximately 30° C. then enters the exterior passages of the coaxial ducts 38 and is then collected in collectors 42, 43, which are located coaxially with respect to distributors 35, 37, or in other words, with the exterior ducts now acting as collectors and the interior ducts as distributors for the gas.

The entire system of tubes underneath turbine chamber 11 is designed in such a manner that the turbine exhaust duct at about 500° C. is surrounded on all sides by cold gas, thereby preventing the build-up of temperature stresses in the concrete hull. The coaxial gas ducts as well as all other cavities in the concrete structure are moreover covered with gas-tight steel liners which are protected by heat insulation and cooled by water. The liners also are subjected to merely moderate temperature stresses, since streams of hot gas are always surrounded by streams of cooler gas. The pressure differential between gas streams flowing coaxially, in normal operation, and depending upon the load, amount to 0.7 – 4 bar. Tubing which is freely distributed inside the liners is therefore exposed to relatively low pressures, while the pressures of the exterior gas streams are absorbed by the cement liner.

From collectors 42, 43 the cooled gas passes through two simple (not coaxial) horizontal passages 44 and into a vertical cylindrical duct 45, from which it proceeds to low-pressure compressor 14 where it is compressed to 36 bar. From low-pressure compressor 14 two coaxial ducts 46 lead to pods 29, 30 in which the four intermediate coolers 33 are installed. The helium flows to the two pods in the exterior tubes at approximately 125° C. and is divided into two streams, one directed upward, the other downward. Both parts of the split stream then flow through an annular shaped aperture 47 located between the pod and the intermediate coolers 33, then through the intermediate coolers on the jacket side and then enter in region 48 into the inner duct of the coaxial tube 46 which is located between the stacked intermediate coolers. The gas, now cooled to about 30° C. reaches high-pressure compressor 13.

From high-pressure compressor 13 the gas, now compressed to 64 bar, enters into the hollow space 49 surrounding the turbine housing and the intake valves 21. The pressurized gas then flows through two simple vertical ducts 50 and four manifold gas pipes 51 which run partially coaxially to the hot-gas ducts 19, and then into the distributor heads 52 of recuperators 31. The four high-pressure tubes 19 connecting the reactor 4 with the turbine 12 are likewise surrounded by relatively cold pressurized gas (125° C.) so that neither the liners nor the concrete are affected by high temperature.

The helium gas flows from the distributor heads 52 through the bundled tubes of the recuperators 31 and is heated to about 450° C. by the exhaust gas from the turbine flowing in opposite direction. It is then brought back to the collector heads 53 of the recuperators 31 located on top of distributor head 52. By way of six tubes 54 which partially pass through high-pressurized cold-gas ducts 50, 51 the pre-heated gas is finally returned to a collecting space 55 on the reactor 4. Before returning to the reactor core, the helium flows along the space between the thermal shield and the reactor wall, thereby cooling these areas (not shown). The gas is then deflected by ceiling reflector 9, it enters into the space 56 on top of the ball pile, and is returned to the ball pile.

In four vertical shafts or pods 57 symmetrically distributed around the reactor pod 6 on the same circle as pods 23, 24 . . . 30 and at the same height as the recuperators 31, an auxilliary or back-up cooling system 58 of a known design is installed with a capacity of 4 × 50% and consisting of blowers, recuperators and coolers. Since this auxilliary system is not a part of the present invention, these components are not shown in detail. The system 58 receives hot gas through duct 59, cools it in the recuperator to about 450° C. and subsequently in the cooler, to about 50° C. It increases the pressure by means of the blower, and the temperature rises to about 70° C. The condensed gas flows back into the recuperator through a centrally located pipe, it is re-heated to 400° C. and is carried back onto the reactor 4 through duct 60 on the side of the cold gas.

In order to be able to separate the reactor 4 from the primary circuit, shut-off valves 61 are installed in the input ducts 54 and the hot-gas ducts 19. For the purpose of repaid and maintenance operations these shut-off valves 61 are accessible through vertical shafts 62, while other valves are located in the shafts or pods for cold-gas lines 50, 51 and are accessible from the top.

In the following paragraph the main or turbine circuit is once more summarized in brief.

The work process of the primary circuit takes place within the range between a maximal pressure of 64.3 bar and a minimum pressure of 19.9 bar; the temperature ranges between an upper limit of 850° C. and the lower limit of 30° C. The gas, heated to 850° C. under 60 bar pressure, flows by way of tubes 19 from the hot-gas accumulator 10 directly into the four intake valves 21 of turbine 12.

In turbine 12 the working gas is expanded to 20.7 bar and it temperature reduced to about 500° C. It enters into the recuperators 31 by way of coaxial tubes 38 and the central pipes 39, flowing through the recuperator 31 on the side of the jacket. On contact with the cold gas that flows along the high-pressure side of the recuperators 31 the gas is further cooled to about 160° C. prior to entering pre-coolers 32. Here it is chilled to the lowest temperature in the process range of 30° C. and collected in collectors 42, 43 prior to entering low-pressure compressor 14 by way of gas pipes 44 and duct 45.

In the low-pressure compressor 14 the working gas is raised in ambient pressure to 64.3 bar and its temperature raised to 125.6° C., and it is transported by way of coaxial tubes 46 into intermediate coolers 33. There the gas is recooled to 30° C. after which it flows through the interior tube of coaxial tubing 46 and enters the high-pressure compressor 13 under a pressure of 35.8 bar. There the pressure is raised to the maximum of 64.3 bar and the gas is returned to the distributor head 52 by way of cold-gas lines 50, 51, and subsequently distributed over the tube bundles of recuperators 31 at a temperature of 125.6° C. The high-pressure gas is then heated to 455.2° C. by the heat supplied by the low-pressure surface of the recuperators and subsequently brought directly through tubes 54 to the cold-gas collection space 55 of the high temperature reactor 4.

What is claimed is:

1. A nuclear power plant, comprising:
   a. an inner, generally cylindrical pressure vessel;
   b. a high-temperature reactor contained within a generally centrally oriented cavity within said inner vessel;
   c. a gas tubine assembly located in a horizontally oriented chamber positioned in said inner vessel beneath said reactor;
   d. a plurality of heat exchanger means positioned in a plurality of vertically oriented pods spaced radially about said reactor in the wall of said inner vessel, there being a plurality of first such heat exchanger means and at least one second heat exchanger means;
   e. a plurality of hot gas conduit means interconnecting said reactor and said turbine assembly, each of said hot gas conduit means including a horizontal connection to said reactor and to said turbine and a vertical section between said connections;
   f. a combined turbine exhaust gas distribution/cooled gas collection system horizontally positioned in the bottom wall of said inner vessel beneath said gas turbine assembly, said distribution/collection system comprising distribution means including inner conduit means for transporting exhaust gas from said turbine to each of a plurality of said first heat exchanger means and collection means including outer conduit means, coaxial to said inner conduit means, for transporting cooled gas from each of said first heat exchanger means to a collection point, said conduit means being comprised of horizontally and vertically oriented sections, whereby said distribution means and said collection means are disposed coaxially with respect to one another; and
   g. means for transporting cooled gas from said collection point to said reactor, including at least as many vertically extending cool gas conduit means as the number of said hot gas conduit means, one of said vertically extending cool gas conduit means coaxially surrounding the vertical section of each of said hot gas conduit means, whereby each of said conduits carrying gas at an elevated temperature is surrounded by cooler gas flowing in a coaxially arranged conduit.

2. The nuclear power plant as defined by claim 1, wherein said first heat exchanger means comprise a recuperator coupled with a pre-cooler, said recuperator being positioned vertically with respect to said pre-cooler in said vertical pod.

3. The nuclear power plant as defined by claim 2, wherein there are six of said first heat exchanger means and wherein said pre-cooler is in each instance positioned beneath said recuperator.

4. The nuclear power plant as defined by claim 2, wherein said vertically oriented pods are spaced symmetrically in a circle about said reactor.

5. The nuclear power plant as defined by claim 1, wherein said vertically extending cool gas conduit means are arranged as pods spaced about said reactor.

6. The nuclear power plant as defined by claim 4, wherein said gas turbine assembly comprises a gas turbine, a high-pressure compressor and a low-pressure compressor, said turbine assembly being removable as a single unit.

7. The nuclear power plant as defined by claim 6, wherein said means for transporting cooled gas from said collection point to said reactor comprises, interconnected in series between said collection point and said reactor, said low-pressure compressor, at least one of said second heat exchanger means, said high-pressure compressor, and a parallel connection to each of said recuperators, wherein said vertically extending coal gas conduit means are positioned between said high-pressure compressor and each of said recuperators.

8. The nuclear power plant as defined by claim 7, wherein said means for transporting cooled gas from said collection point to said reactor further comprises conduit means for transporting re-heated cool gas from each of said recuperators to said reactor, a substantial portion of the length of said re-heated gas conduit means being positioned within one of said vertically extending cool gas conduit means, whereby said conduit means carrying re-heated gas are surrounded over said portion of length by cool gas in said vertically extending conduit means.

9. The nuclear power plant as defined by claim 1, further comprising vertically oriented conduit means connecting each of said first heat exchanger means with said distribution means and, coaxially surrounding said vertically oriented conduit means, outer vertically extending conduit means connecting each of said first heat exchanger means with said collection means.

10. The nuclear power plant as defined by claim 7, further comprising a single vertical gas transporting conduit connecting said collection point and said low-pressure compressor.

11. The nuclear power plant as defined by claim 6, wherein said gas turbine, high- and low-pressure compressors are connected to a single shaft which is rigidly coupled to a generator.

12. The nuclear power plant as defined by claim 1, wherein the high-temperature reactor is equipped at its base with four radially placed connectors each of which leads into a vertically placed gas conduit, and wherein a horizontal conduit leads from each vertically placed conduit to a symmetrically arranged turbine-intake connector.

13. A nuclear power plant as defined by claim 12, wherein said reactor comprises graphite packing thereabout and said packing extends along said radially placed connectors to said vertically placed gas conduits.

14. The nuclear power plant as defined by claim 6, wherein there are two of said second heat exchanger means in said vertically oriented pods and wherein each comprises an intermediate cooler.

15. The nuclear power plant as defined by claim 14, wherein each of said two vertically oriented pods comprises two intermediate coolers arranged one above the other, and further comprising a coaxial gas transfer conduit leading from said low-pressure compressor to each of said intermediate cooler-containing pods and back to said high-pressure compressor, whereby gas flow toward said intermediate coolers takes place in the exterior path of said coaxial conduit and gas flow to said high-pressure compressor takes place in the interior path of said coaxial conduit.

16. The nuclear power plant as defined by claim 1, wherein said vertically oriented pods containing said heat exchanger means comprise gas-tight steel liners provided with insulation and water-cooling means.

17. The nuclear power plant as defined by claim 1, further comprising a secondary heat absorption means positioned inside said inner vessel, said device comprising a blower.

18. The nuclear power plant as defined by claim 17, wherein said secondary heat absorption means further comprises a recuperator and a cooling means.

19. The nuclear power plant as defined by claim 17, wherein one of said secondary heat absorption means is arranged in each of four vertically oriented pods spaced symmetrically around said reactor.

20. The nuclear power plant as defined by claim 1, further comprising control means for flow of said gas, all of said control means being located in vertically arranged chambers for easy accessibility from outside said inner vessel.

21. The nuclear power plant as defined by claim 1, further comprising a pressure tight safety vessel surrounding said inner vessel and all components carrying said gas.

22. The nuclear power plant as defined by claim 21, wherein said safety vessel comprises a cylindrical housing for holding a generator, said housing including pressure- and gas-tight sealing means.

* * * * *